Nov. 13, 1956 R. WARNECKE ET AL 2,770,780
SYMMETRICAL INTERDIGITAL LINE FOR TRAVELLING WAVE TUBES
Filed April 17, 1952 2 Sheets-Sheet 1

INVENTORS
ROBERT WARNECKE
OSKAR DOHLER
By: Hazeltine, Lake & Co.
AGENTS

United States Patent Office 2,770,780
Patented Nov. 13, 1956

2,770,780

SYMMETRICAL INTERDIGITAL LINE FOR TRAVELLING WAVE TUBES

Robert Warnecke and Oskar Dohler, Paris, France, assignors to Compagnie Generale de Telegraphie Sans Fil, a corporation of France Application April 17, 1952, Serial No. 282,761

Claims priority, application France April 23, 1951

6 Claims. (Cl. 333—31)

This invention relates to delay lines suitable for use in travelling wave discharge tube arrangements.

Figure 1:
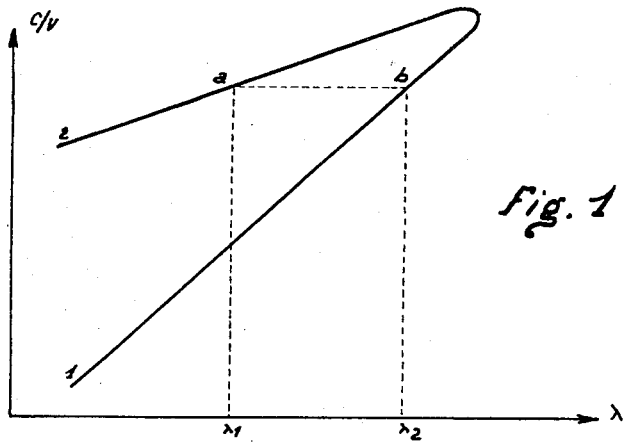
Figure 5:
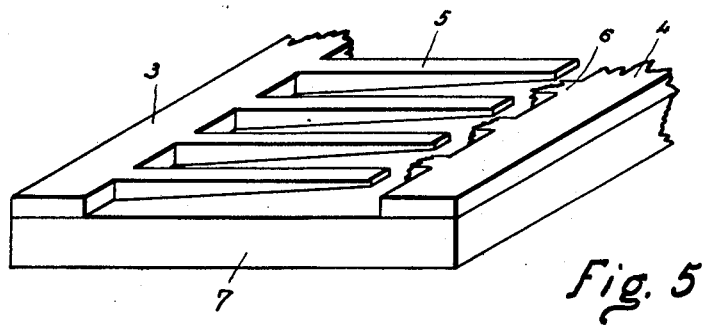
Figure 6:
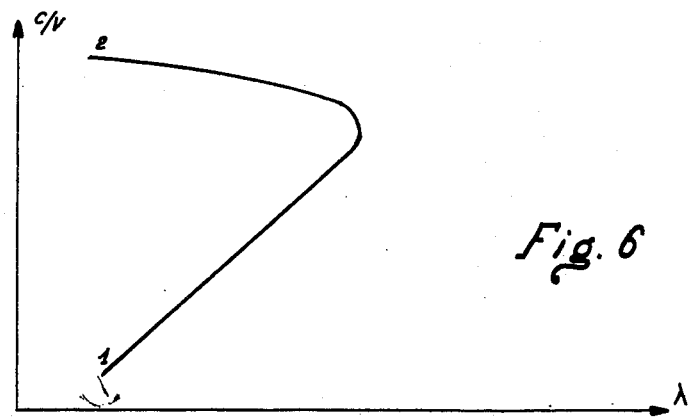

The invention is illustrated in and explained in connection with the accompanying drawings in which Figures 1 and 6 are explanatory graphical figures and Figures 2 to 5 inclusive are perspective views which illustrate embodiments of this invention.

A so-called interdigital delay line, that is to say a line constituted by two comb-like members the fingers of which interleave, is of great advantage for use as the delay line in a travelling wave discharge tube, because it is easily constructed, has good heat dissipation qualities, and is such as to render the insulation of the electrodes at different potentials easy. Moreover the dispersion of the fundamental wave propagated in such a line when so used is what is called "abnormal," that is to say the phase speed and the group speed are oppositely directed and by utilising such a line with interaction between the beam in the tube and the wave corresponding to the fundamental mode of oscillation, reaction occurs between the input and the output because of amplification of the energy propagated from the output to the input as is explained in the specification accompanying co-pending application Ser. No. 281,347 filed April 9, 1952 by B. Epstein and assigned to the same assignee to which attention is directed. If an interdigital line is utilised in an amplifier of the travelling wave tube type the first harmonic of the wave propagated along the line must therefore be used. It may be shown by calculation that this harmonic oscillation has a "normal" dispersion the phase speed and the group speed being of the same sign. Now, in known interdigital lines, the relation of the "delay rate"—that is to say the speed $c$ of light divided by the phase speed $v$ of the wave—to the wave length ($\lambda$) may be represented graphically by a curve such as is shown in Figure 1 having two portions 1 and 2, the portion 1 having an abnormal dispersion corresponding to the fundamental of the wave being propagated along the line and the portion 2 corresponding to the first harmonic and having a normal dispersion. It is the portion 2 which prevails in travelling wave amplifiers.

As will be seen from Figure 1, the curve relating $\lambda$ with $c/v$ is such that there is generally the same phase speed for two different wave lengths (for example the points $a$ and $b$), a wave length $\lambda_1$ on the "normal" portion 2 and another $\lambda_2$ on the "abnormal" portion 1. It therefore follows that, if amplification is sought to be effected at the wave length $\lambda_1$ appropriate to the point $a$, there is a liability to self-oscillation on the wave length $\lambda_2$ appropriate to the point $b$ due to the inverse mode.

The present invention seeks to provide improved interdigital lines such that self-oscillation due to this cause cannot exist.

According to this invention, the two comb-like members of the line are fixed on a common plate and the fingers thereof are disposed at a very short distance from this plate.

If on the one hand, the fingers are of tapered profile and of section which gradually diminishes from base to end, the bases may touch the common plate.

If, on the other hand, the section of the fingers is constant, and if their profile is rectangular, the distance between the fingers and the common plate must be very small—less than 0.5% of the wave length.

Figure 2:
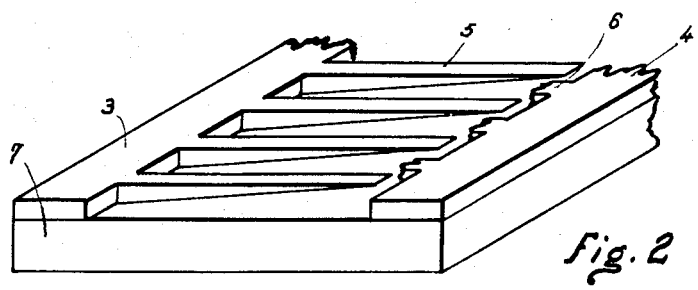

Figure 2 represents one form of interdigital line in accordance with the invention and having two comb-like members 3, 4, with interleaved fingers 5, 6 (fingers 6 are shown as broken away in order to make the drawing clearer), fixed on a common plate 7. The longitudinal section of the fingers is here triangular and the bases of the fingers touch the plate 7. The length of the fingers is almost $\lambda/4$ where $\lambda$ is the wave length.

Figure 3:
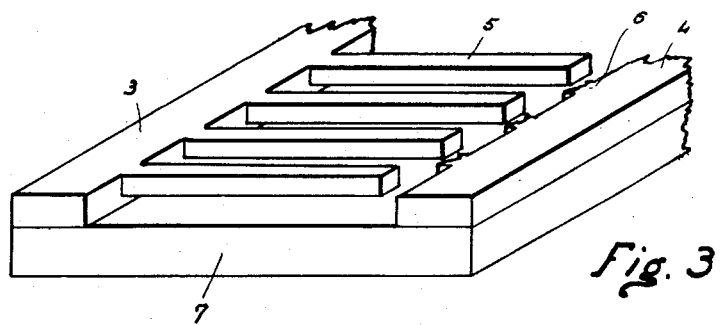

Figure 3 illustrates a modification, wherein the longitudinal section of the fingers is rectangular, the distance between the line members and the plate 7 being less than 0.5% of the wave length.

Figure 4:
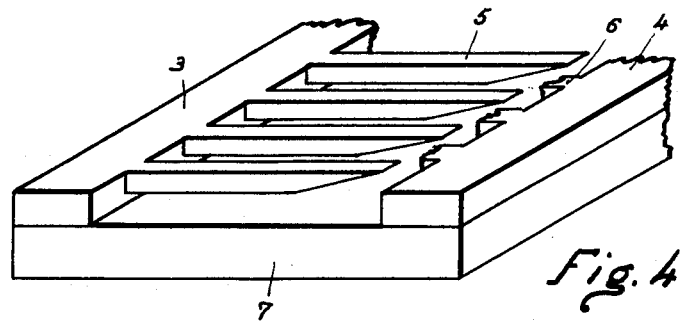

A further modification is illustrated in Figure 4, where the fingers are of rectangular longitudinal section over most of their lengths but end in tapered portions of triangular longitudinal section. Here too the distance between the fingers and the plate is less than 0.5% of the wave length.

Another modification is illustrated in Figure 5. Here the longitudinal section of the finger is trapezoidal and the trapezoidal bases touch the common plate 7.

Calculations and experiment show that lines as illustrated in Figures 2, 3, 4, 5 give a dispersion curve ($c/v$ against $\lambda$) of the form shown in Figure 6. It will be seen from Figure 6 that, in contra-distinction to Figure 1, the wave length $\lambda$ is what may be termed a monotone function of the ratio $c/v$, that is to say that for a given delay rate there is no point in the portion 2 corresponding to a point in the portion 1 such as will give rise to self-oscillation as hereinbefore explained. Such a line has therefore the advantage of permitting stable amplification without parasitic oscillations, while at the same time having a wide frequency band of operation.

We claim:

1. A delay line adapted for use for the introduction of delay in the phase propagation of ultra high frequency waves in the direction of its axis, said line comprising two symmetrical comb-like members having alternately interleaved fingers and a common plate extending parallel to the plane of said members, said members being carried on said plate, an interval being provided between at least all but the bases of the fingers and the plate, the distance between said fingers and said plate not exceeding 0.5% of the wavelength of said ultra high frequency wave.

2. A line as claimed in claim 1, having fingers with a tapered profile which touch said plate at the point of greatest cross-section at the base ends of said fingers.

3. A line as claimed in claim 1, having fingers of constant section.

4. A line as claimed in claim 1, having fingers whose longitudinal section taken perpendicular to the plane of the comb-like members is triangular and which touch the plate at their bases.

5. A line as claimed in claim 1, having fingers whose longitudinal section taken perpendicular to the plane of the comb-like members is trapezoidal and which touch the plate at their bases.

6. A line as claimed in claim 1, having fingers whose longitudinal section taken perpendicular to the plane of the comb-like members is rectangular near the bases and triangular towards the ends.

References Cited in the file of this patent

UNITED STATES PATENTS

| | | |
|---|---|---|
| 2,432,466 | Burns | Dec. 9, 1947 |
| 2,508,280 | Ludi | May 16, 1950 |
| 2,511,407 | Kleen et al. | June 13, 1950 |
| 2,532,545 | Everhart | Dec. 5, 1950 |
| 2,566,087 | Lerbs | Aug. 28, 1951 |
| 2,567,748 | White | Sept. 11, 1951 |
| 2,577,619 | Kock | Dec. 4, 1951 |
| 2,609,522 | Hull | Sept. 2, 1952 |